United States Patent

[11] 3,620,397

| [72] | Inventor | Robert Gagnon<br>Box 46, Val Caron, Ontario, Canada |
|---|---|---|
| [21] | Appl. No. | 864,074 |
| [22] | Filed | Oct. 6, 1969 |
| [45] | Patented | Nov. 16, 1971 |

[54] TILTABLE TRAILER
3 Claims, 5 Drawing Figs.

[52] U.S. Cl. .................................................. 214/506,
298/5
[51] Int. Cl. ....................................................... B60p 1/28
[50] Field of Search ............................................ 298/5, 6,
17, 19, 20; 214/505, 506

[56] References Cited
UNITED STATES PATENTS

| 1,126,912 | 2/1915 | Sturgis ........................... | 296/28.22 |
| 1,563,685 | 12/1925 | Boys ............................... | 298/20 |
| 2,495,354 | 1/1950 | Spearing ......................... | 298/5 |
| 2,803,362 | 8/1957 | Saenz ............................. | 298/5 |
| 3,061,124 | 10/1962 | Schueller ........................ | 298/5 |
| 3,503,620 | 3/1970 | Koskovich ...................... | 298/17 |
| D.149,806 | 6/1948 | Gaboury ......................... | 298/17 UX |

*Primary Examiner*—Richard J. Johnson
*Attorney*—W. Irwin Haskett

ABSTRACT: A single axle, vehicle trailer having a platform, or box, that can be easily tilted for loading or unloading without disconnection of the hitch from the towing automobile. The trailer frame is especially designed for antitorque strength and rigidity, relative to its size and weight, rendering it particularly suitable for transporting special loads such as one or two motorized snow vehicles or the like. Four angle members outline the elongated rectangular wheel-carried frame that has a uniquely applied backbone reinforcing it along the longitudinal median and to which backbone the draft tongue or tow bar is pivotally connected.

TILTABLE TRAILER

This invention relates to a tiltable trailer and appertains particularly to a single axle vehicle trailer suitable for towing by a conventional passenger automobile.

An object of the invention is to provide a tiltable, single axle, vehicle trailer having a strong, rigid, torque-resisting frame, pivotally connected to the tongue or tow bar and easily unlocked from nonpivoting relation therewith to allow the frame to tilt for loading or unloading without disconnection of the tongue from the towing vehicle.

A further object of the invention is to provide a tiltable vehicle trailer of the character described embodying a uniquely constructed, lightweight, reinforced frame designed to resist torque even when fully loaded on one side and empty on the other side.

A further object of the invention is to provide a tiltable trailer of the character described having a reinforced rectangular frame pivotally attached in tiltable relation to a braced tongue.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

FIG. 3 is an enlarged vertical sectional detail showing the pivotal and releasable locking connections between the wheel-carried, tiltable frame and the draft tongue;

FIG. 4 is a sectional elevation showing the rearwardly facing side of the reinforcing plate on the frame's front angle member; and FIG. 5 is a similar elevation showing the forwardly facing side of the reinforcing plate on the frame's rear angle member.

Figure 1:
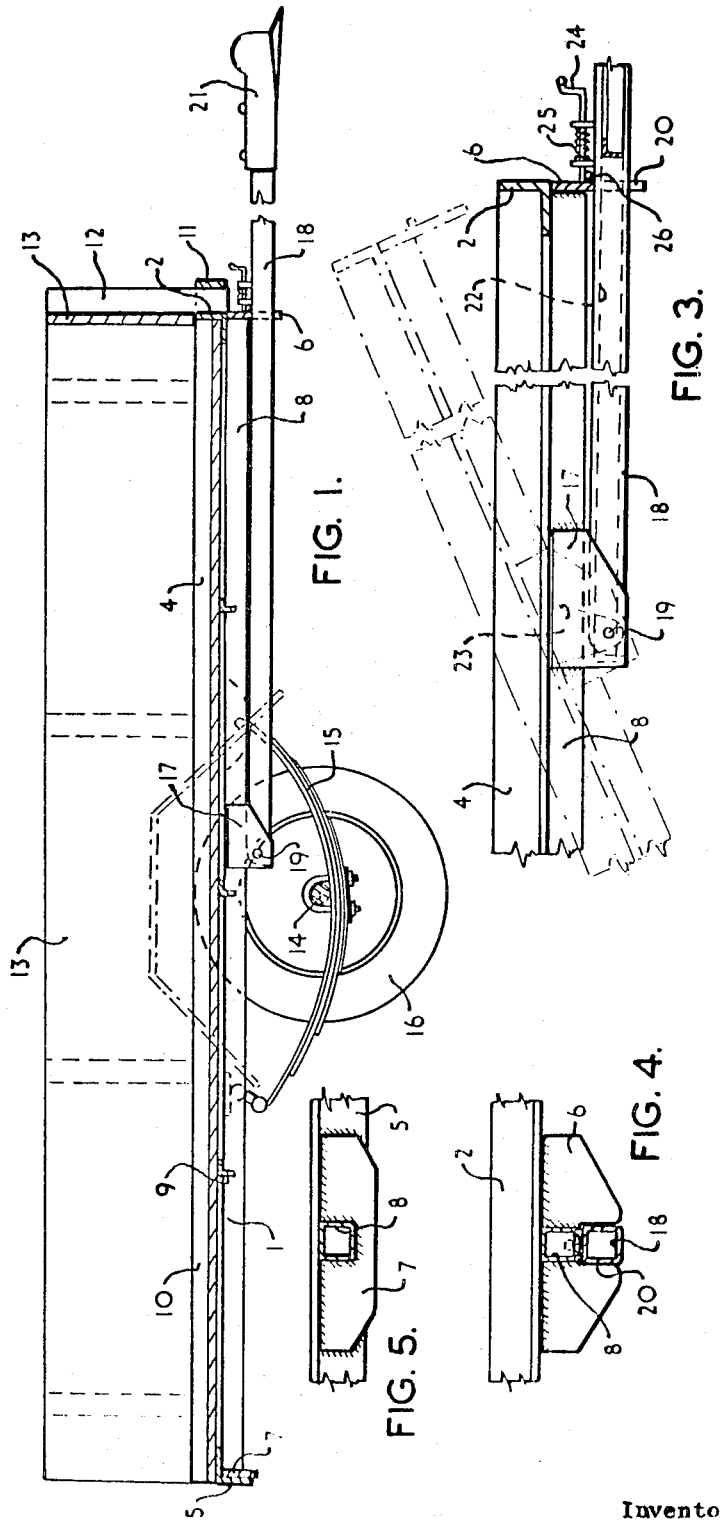
FIG. 1 is a longitudinal vertical section of the trailer.

In a broad sense the trailer consists of a specially reinforced elongated rectangular frame supported about midway of its length by a pair of wheels on opposite ends of a single axle and having a draft tongue pivotally connected with the under side of the reinforced frame and projecting from the forward end for connection with a towing vehicle.

The elongated rectangular frame 1 consists of four angle members, namely, a front, right and left side and a rear angle member 2, 3, 4, and 5 respectively. The front angle member 2 and the opposite side angle members 3 and 4 each have one arm of the angle rising vertically and the other arm extending horizontally inwards while the rear angle member 5 has one arm of the angle depending vertically and the other arm extending horizontally inwards, all four angle members having their respective inwardly extending horizontal angle arms lying in a common plane, and such angle members being connected to the adjoining angle members at the mitered corners of the frame by welded joints.

A vertically disposed, transversely extending reinforcing plate 6 is attached as by welding to the under side of the front angle member 2, depending therefrom centrally of the ends thereof and flush with the forward side of said angle member as seen in FIG. 4. A substantially similar vertically disposed, transversely extending reinforcing plate 7 is welded to the forwardly facing side of the depending arm of the rear angle member 5, centrally of the ends thereof, as seen in FIG. 5.

Figure 2:
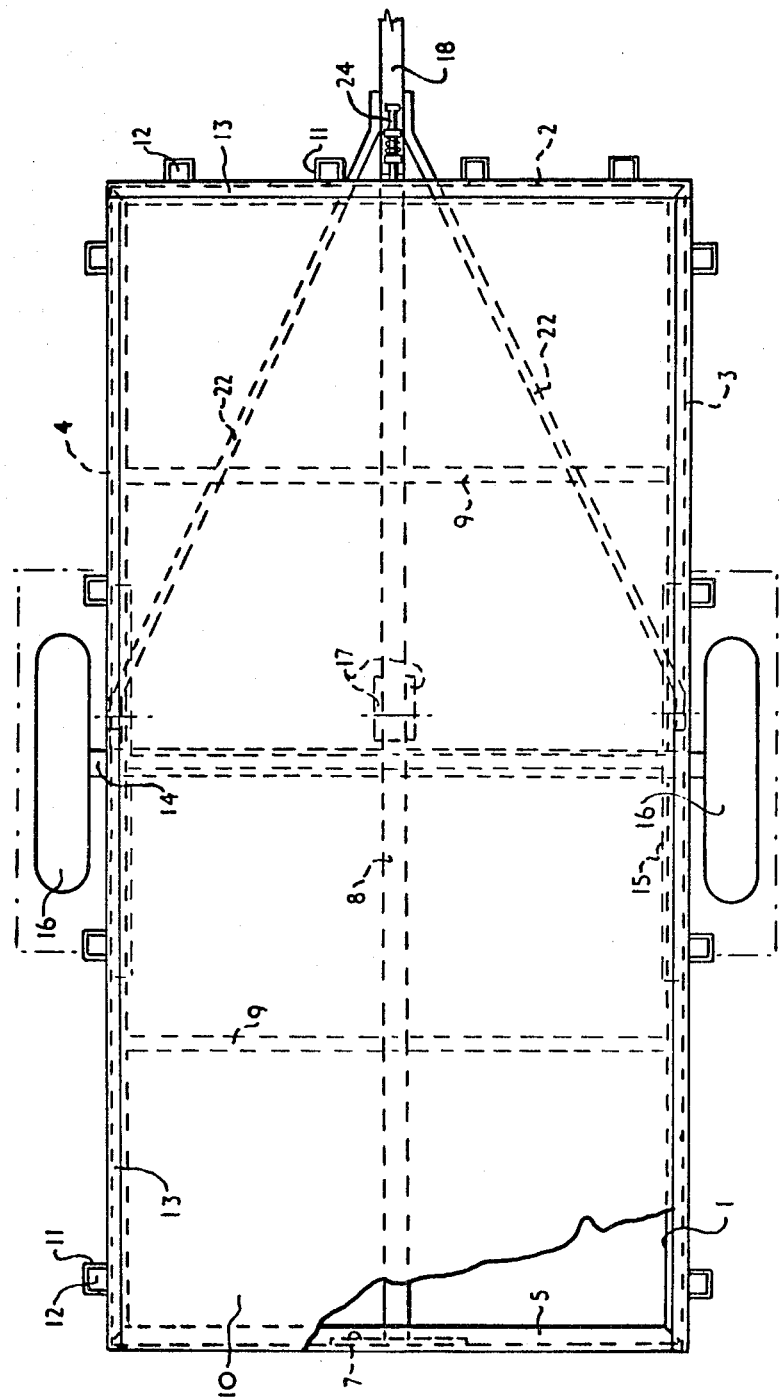
FIG. 2 is a plan view thereof.

Running between the front and rear angle members 2 and 5 is a reinforcing backbone in the form of a pipe 8 of rectangular cross section that lies along the longitudinal median, as seen in FIG. 2, and is welded front and rear to the confronting faces of the transversely extending reinforcing plates 6 and 7 respectively. A number of longitudinally spaced transverse angles 9 extend across the frame, their ends being welded to the opposite side angle members 3 and 4 and the downturned arm of each is cut away at the center to allow the transverse angle to pass over the backbone 8 to which such angle is also welded. In conjunction with the horizontal inturned arm of the front and side angle members 2, 3 and 4, the upper horizontal arm of these transverse angles 9 provide a coplanar base for the floor or platform 10 that extends from side to side and the full length of the frame 1.

To carry a wall or box, spaced outwardly projecting rectangular brackets 1 are provided on the outside of the upstanding arms of the front and opposite side angle members 2, 3 and 4 for the reception of stakes 12 secured on the outside of wall panels 13 that rest on the top edge of the said upstanding arms of the angle members. No rear gate is shown but one may be employed if desired.

A single axle 14 extends transversely below the frame, approximately midway of the length thereof, being carried by springs 15 mounted on the underside of the frame angle members 3 and 4 and having a pair of pneumatic-tired wheels 16 on opposite ends.

Vertically disposed tongue hinge plates 17 are welded on opposite sides of the rectangular backbone pipe 8 just forward of center and depend below the backbone pipe to accommodate between their depending portions the rear end of a draft tongue 18, in the form of a pipe that is square in cross section similar to the backbone and is pivotally connected to the spaced plates by a transverse pivot pin 19. The tongue extends forwardly beyond the front of the trailer frame, passing through a rectangular notch 20 running in from the bottom of reinforcing plate 6, and terminating at its front end in a conventional releasable hitch 21. The notched plate 6 maintains the tongue in longitudinal alignment with the median of the trailer frame. Additionally, a pair of tongue braces 22 connected to opposite sides of the tongue forwardly of the frame, diverge to engage pivot plates 23 that depend from the under side of the opposite side angle members 3 and 4 and are connected thereto by pivot pins that are axially aligned with the tongue pivot pin 19.

To secure the tilting frame 1 to the draft tongue 18 in operative horizontal position, when the tongue is hitched to a towing vehicle, a bolt 24 is slidingly mounted on the upper side of the tongue, immediately in front of the frame and urged rearwardly by a compressed coil spring 25 against the forward side of reinforcing plate 6 to overlie a transverse horizontal block or keeper 26 secured thereto.

In use it will be seen that a sturdy torque-resisting, lightweight, good tracking, single axle vehicle trailer is provided that can be hitched in the usual way by its draft tongue to a towing automobile. By releasing the spring-urged bolt 24, the frame 1 can be tilted to allow the rear thereof to descend to the ground for easy load and unloading. If pieces such as motorized snow vehicles are being loaded or unloaded, unimpeded access is afforded because the transverse rear angle member 5 is downturned and the platform floor 10 extends to the very back edge. If all the load is applied on one side of the platform, the frame, reinforced by the relatively wide transversely extending plates 6 and 7 connected by the square pipe backbone 8, provides excellent resistance to twist or torque.

Various changes in the size, shape and arrangement of parts may be made to the forms of invention herein shown and described, without departing from the spirit of the invention or scope of the claims.

I claim:

1. A tiltable trailer comprising an elongated rectangular frame, a pair of wheels supporting said frame, a tongue pivotally connected to said frame and a latch releasably locking the frame to the tongue against relative pivotal movement, wherein said frame consists of front, side and rear angle members, the front and opposite side angle members each having one arm of the angle extending vertically and the other arm extending horizontally inwards and the rear angle member having one arm of the angle depending vertically and the other arm extending horizontally inwardly, the four angle members having their respective inwardly extending horizontal arms in a common plane and being connected to adjoining angle members at the corners of the frame by a welded joint, a vertically disposed transversely extending reinforcing plate attached to each of said front and rear angle members at the center thereof, and a reinforcing backbone disposed on the longitudinal median of said frame being a pipe of rectangular cross section connected by a welded joint to the confronting sides of said front and rear angle member reinforcing plates.

2. The tiltable trailer according to claim 1, wherein said tongue has a pair of braces secured to opposite sides thereof forwardly of the front of said frame, pivot plates depending at opposite sides of said frame, said braces diverging to opposite sides of the frame to engage said pivot plates, a vertically disposed hinge plate on each side of said backbone just forward of the center of the frame and depending below said backbone to accommodate the rear end of said tongue therebetween, and pivots connecting said tongue with said hinge plates and the rear ends of said braces with said pivot plates respectively, all of said pivots being in axial alignment.

3. The tiltable trailer according to claim 1, wherein said tongue is a pipe of rectangular cross section directly underlying said backbone and said reinforcing plate attached to the front angle member has a centrally located rectangular tongue-accommodating notch extending therein from the bottom to maintain said tongue in longitudinal alignment with the median of the trailer frame.

* * * * *